(12) United States Patent
Bostick et al.

(10) Patent No.: US 9,906,611 B2
(45) Date of Patent: Feb. 27, 2018

(54) LOCATION-BASED RECOMMENDATION GENERATOR

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 14/859,442

(22) Filed: Sep. 21, 2015

(65) Prior Publication Data

US 2017/0085657 A1    Mar. 23, 2017

(51) Int. Cl.

| | |
|---|---|
| *G06F 15/16* | (2006.01) |
| *H04L 29/08* | (2006.01) |
| *H04L 12/58* | (2006.01) |
| *G06N 5/02* | (2006.01) |
| *H04W 4/18* | (2009.01) |
| *H04W 4/20* | (2018.01) |

(52) U.S. Cl.
CPC .............. *H04L 67/22* (2013.01); *G06N 5/02* (2013.01); *H04L 51/20* (2013.01); *H04L 51/32* (2013.01); *H04L 67/18* (2013.01); *H04L 67/306* (2013.01); *H04W 4/18* (2013.01); *H04W 4/206* (2013.01)

(58) Field of Classification Search
CPC ....... H04L 67/22; H04L 67/306; H04L 67/18; H04L 51/32; G06N 5/02
See application file for complete search history.

(56) References Cited

U.S. PATENT DOCUMENTS

| 8,463,295 B1 | 6/2013 | Caralis et al. |
| 2006/0161553 A1 | 7/2006 | Woo |
| 2010/0235313 A1 | 9/2010 | Rea et al. |

(Continued)

FOREIGN PATENT DOCUMENTS

| CN | 101300573 A | 11/2008 |
| WO | 2011139687 A1 | 11/2011 |

OTHER PUBLICATIONS

Klincewicz, Stefan, "Weaving Social into an Integrated Cross-Channel Marketing Strategy", Enterprise Marketing Management, SmarterCommerce, © 2014 IBM Corporation, pp. 1-31.

(Continued)

*Primary Examiner* — Richard G Keehn
(74) *Attorney, Agent, or Firm* — Steven Lee Fisher-Stawinski; Isaac J. Gooshaw (57) ABSTRACT

A computer-implemented method includes identifying a profile. The method identifies one or more mobility patterns. The one or more mobility patterns are associated with the profile. The method identifies social media content from at least one location. The social media content from at least one location is associated with the profile. The method identifies user generated content from at least one location. The user generated content is associated with the profile. The method determines a set of behavioral patterns for the profile. The set of behavioral patterns is based on the mobility patterns, the social media content from at least one location, and the user generated content from at least one location. The method returns a recommendation for the profile. A corresponding computer system and computer program product are also disclosed.

18 Claims, 4 Drawing Sheets

(56) References Cited

U.S. PATENT DOCUMENTS

| | | | |
|---|---|---|---|
| 2012/0089605 A1 | 4/2012 | Bangalore et al. | |
| 2013/0073387 A1* | 3/2013 | Heath | G06Q 50/01 705/14.53 |
| 2013/0073400 A1* | 3/2013 | Heath | G06Q 30/02 705/14.73 |
| 2013/0073473 A1* | 3/2013 | Heath | G06Q 30/02 705/319 |
| 2013/0316735 A1 | 11/2013 | Li et al. | |
| 2014/0100835 A1* | 4/2014 | Majumdar | G06Q 10/047 703/11 |
| 2015/0350349 A1* | 12/2015 | Kao | H04L 67/18 709/204 |
| 2016/0007912 A1* | 1/2016 | Hu | A61B 5/002 600/595 |
| 2016/0057154 A1* | 2/2016 | Ferguson | H04L 63/104 726/7 |
| 2017/0031996 A1* | 2/2017 | Priness | G06F 17/30528 |
| 2017/0032248 A1* | 2/2017 | Dotan-Cohen | G06N 5/02 |
| 2017/0060872 A1* | 3/2017 | Sacheti | G06F 17/3053 |

OTHER PUBLICATIONS

Mangalindan, JP, "Amazon's recommendation secret", Fortune.com, Jul. 30, 2012, pp. 1-3, printed on Jun. 17, 2015.

Mohtasseb et al., "Two-layered Blogger identification model integrating profile and instance-based methods", Knowl Inf Syst (2012) 31:1-21, DOI 10.1007/s10115-011-0398-0, Published online: Apr. 20, 2011, © Springer-Verlag London Limited 2011, pp. 1-21.

Spano, Andrew, "Abduction Topology: The Psycholinguistics of Discourse", Full Book, Aug. 27, 2012, printed on Aug. 3, 2015, pp. 1-4, <http://www.amazon.com/Abduction-Topology-The-Psycholinguistics-Discourse/dp/0985714611>.

Takahashi, Dean, "IBM researcher can decipher your personality from looking at 200 of your tweets", Oct. 8, 2013, printed on Aug. 5, 2015; pp. 1-8, <http://venturebeat.com/2013/10/08/ibm-researcher-can-decipher-your-personality-in-200-tweets/>.

Takahashi, Dean, "How IBM's Michelle Zhou figured out my personality from 200 tweets (interview)", VentureBeat, Oct. 11, 2013, printed on Aug. 5, 2015, pp. 1-6, <http://venturebeat.com/2013/10/11/how-ibms-michelle-zhou-figured-out-my-personality-from-200-tweets-interview/>.

Zhou, Michelle, "System: Computational Discovery of Personality Traits from Social Media for Individualized Experience", IBM Research, Almaden, pp. 1-37, Uploaded Apr. 8, 2014 in slideshare.net.

"IBM's Next Big Thing: Psychic Twitter Bots", pp. 1-4, Fast Company & Inc. © 2015 Mansueto Ventures, LLC, printed on Aug. 5, 2015, <http://www.fastcodesign.com/3025738/ibms-next-big-thing-psychic-twitter-bots>.

* cited by examiner

LOCATION-BASED RECOMMENDATION GENERATOR

BACKGROUND

The present invention relates generally to online recommendations and in particular to generating targeted recommendations.

Recommendation systems are a type of information filtering system. Recommendation systems collect information about a consumer attempting to anticipate a good or service that the consumer would be likely to purchase. Recommender systems may filter information by using content-based, collaborative filtering systems, or both. Content-based filtering systems may base recommendations on characteristics of an item in order to recommend additional, often similar items. Collaborative filtering systems may base recommendations on a user's past behavior and decisions made by the user and other users. Advertisers continue to face challenges when using collaborative filtering systems or content-based filtering systems to generate targeted recommendations.

SUMMARY

A computer-implemented method includes identifying a profile. The method identifies one or more mobility patterns. The one or more mobility patterns are associated with the profile. The method identifies social media content from at least one location. The social media content from at least one location is associated with the profile. The method identifies user generated content from at least one location. The user generated content is associated with the profile. The method determines a set of behavioral patterns for the profile. The set of behavioral patterns is based on the mobility patterns, the social media content from at least one location, and the user generated content from at least one location. The method returns a recommendation for the profile. A corresponding computer system and computer program product are also disclosed.

DETAILED DESCRIPTION

Figure 1:
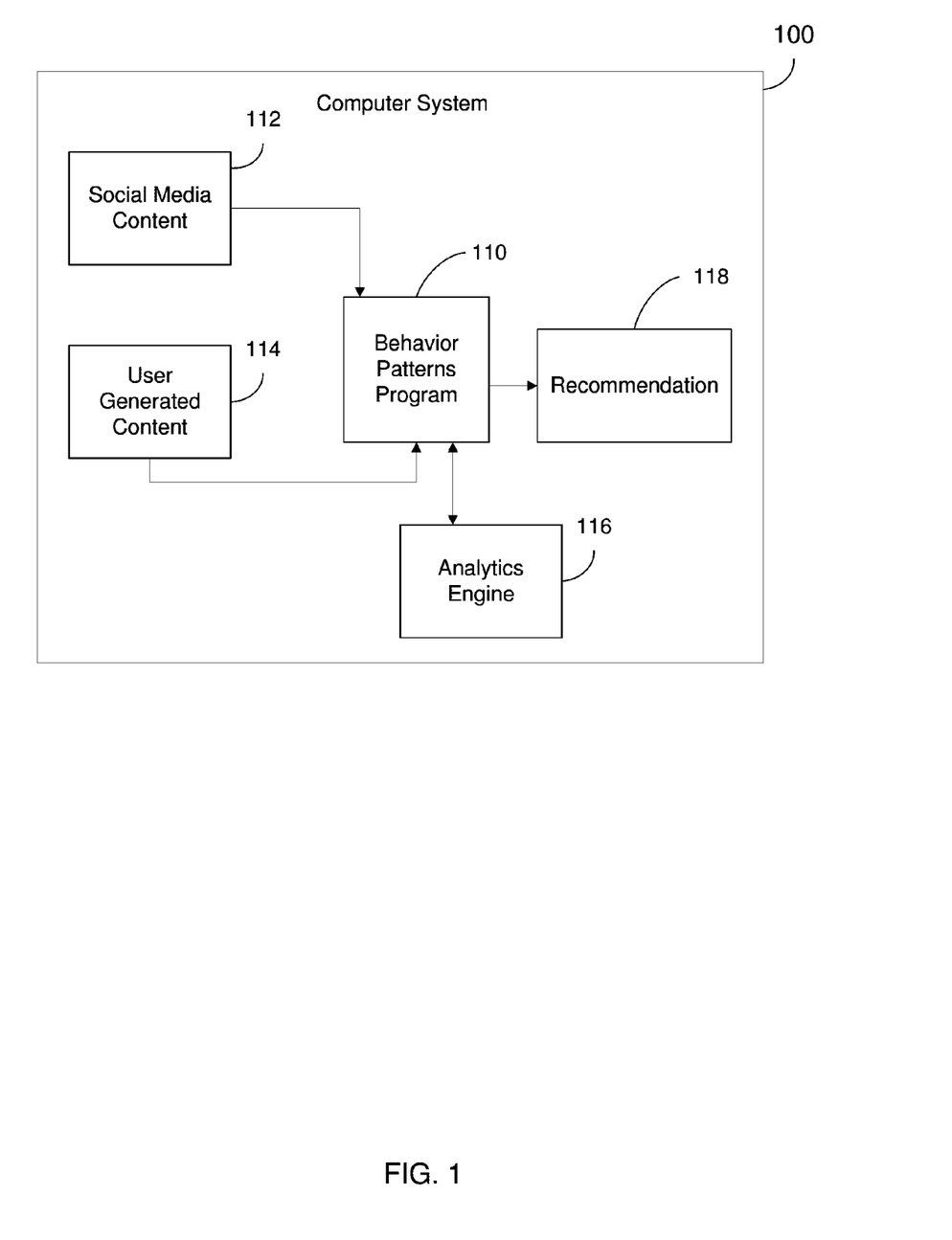
FIG. 1 is a block diagram of one embodiment of a computer system environment suitable for operation in accordance with at least one embodiment of the invention.

Referring now to the invention in more detail, FIG. 1 is a block diagram displaying an exemplary computer system environment suitable for operation of at least one embodiment of the invention. A computer system 100 includes a behavior patterns program 110, an analytics engine 116, social media content 112, user generated content 114, and a recommendation 118, interconnected in the computer system 110. The behavior patterns program 110 may receive input as the social media content 112 and as the user generated content 114. The behavior patterns program 110 may return the recommendation 118, which may include portions of the social media content 112 or the user generated content 114. The behavior patterns program 110 may present content the social media content 112 or the user generated content 114 to the analytics engine 116. The behavior patterns program 110 may receive results from the analytics engine 116 and the behavior patterns program 110 may return the recommendation 118 based on the results from the analytics engine 116.

In general, the social media content 112 may be any data shared or created via a social media outlet. The behavior patterns program 110 may collect, analyze, and otherwise use the social media content 112. Broadly, the social media content 112 may be text, ideas, information, pictures, videos, or other content that is shared in virtual communities via networks such as the Internet. In some embodiments, the social media content 112 is a photograph of a first user that was uploaded to a social media website by a second user, the second user indicating that the photograph is of the first user via the social media website. The social media content 112 may include metadata about the social media content 112, such as the location where the social media content 112 was created, the device the social media content 112 was created on, or the time the social media content 112 was created.

In general, the user generated content 114 may be any data created by an individual. The behavior patterns program 110 may collect, analyze, and otherwise use the user generated content 114. Broadly, the user generated content 114 is any form of content that was created by a user of an online system or service. In some embodiments, the user generated content 114 may be a string of words a user types into a website search engine. The user generated content 114 may be accessible via social media outlets. In some embodiment the user generated content 114 is also the social media content 112. The user generated content 114 may include metadata about the user generated content 114, such as the location where the user generated content 114 was created, the device the user generated content 114 was created on, or the time the user generated content 114 was created.

The computer system 100 may be a management server, a web server, or any other electronic device or computing system capable of processing program instructions, receiving data and sending data. The computer system 100 may be a physical or virtual server computer, a laptop computer, tablet computer, personal computer (PC), desktop computer, or any programmable electronic device capable of communicating with the social media content 112 and user generated content 114. In some embodiments, computer system 100 is a server computing system utilizing multiple computers as a server system, such as in a cloud computing environment. In some embodiments, the computer system 100 represents a computer system utilizing clustered computers and components to act as a single pool of seamless resources. The Computer System 100 may include components, as depicted and described in further detail with respect to FIG. 4. In some embodiments, the computer system 100 may include registries, repositories, or programs (not shown).

In some embodiments, the behavior patterns program 110 is any program, list, database, or any other system capable of receiving the social media content 112 and/or user generated content 114. The behavior patterns program 110 may be a dedicated client behavior patterns program, a function integrated within another program, or any other program or function that can communicate with the social media content 112 and/or the user generated content 114, and provide recommendation 118.

In some embodiments, the behavior patterns program 110 presents the social media content 112 or the user generated content 114 to the analytics engine 116. In such embodiments, the behavior patterns program 110 may receive results from the analytics engine 116 and the behavior patterns program 110 may return the recommendation 118 based on the results from the analytics engine 116. In general, the analytics engine 116 is a software program capable of receiving input, generating results, and communicating the results with the behavior patterns program 110. In some embodiments, the analytics engine 116 is IBM® Watson®. In some embodiments, the analytics engine 116 is a general purpose analytics engine. In other embodiments, the analytics engine 116 operates on a model tailored to recommendation systems. The analytics engine 116 may be configured for finding patterns and efficiencies at the macro level, understood in the context of recommendation systems.

Figure 2:
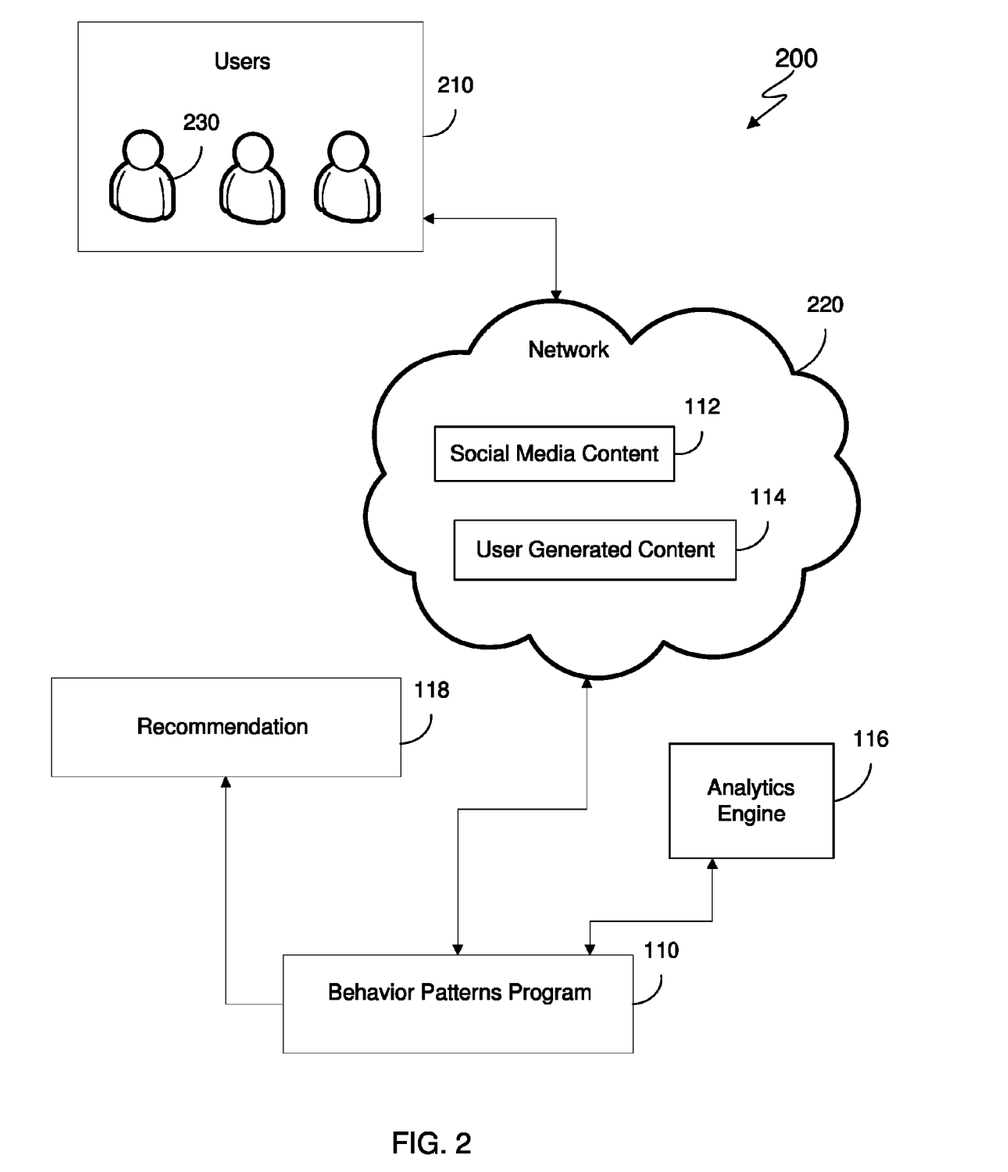
FIG. 2 is a network diagram of an operational environment in accordance with at least one embodiment of the invention.

In the embodiment depicted in FIG. 2, the behavior patterns program 110 exists in an operational environment, generally designated 200. The operational environment 200 includes a network 220, the behavior patterns program 110, the analytics engine 116, the recommendation 118, and users 210. The users 210 are any human beings who access, edit, and create the social media content 112 and/or user generated content 114 via network 220. The behavior patterns program 110 may access the social media content 112 and user generated content 114 via network 220. The behavior patterns program 110 may generate recommendation 118 and communicate the recommendation 118 with users 210 directly or via network 220.

In some embodiments, the behavior patterns program 110 and the analytics engine 116 exist as software programs within the computer system 100. The computer system 100 may also contain the recommendation 118. The behavior patterns program 110 may communicate with the user generated content 114, the social media content 112, the analytics engine 116, an advertisement source (not shown), and a website (not shown) via the network 220. In such an embodiment, the users 210 access the website via the Internet. The behavior patterns program 110 may generate the recommendation 118 by communicating with the analytics engine 116. The behavior patterns program 110 may send the recommendation 118 to the advertisement source via the network 220. The advertisement source sends the recommendation 118 to the website via the network 220. The users 210 view the recommendation 118 on the website via the Internet. The steps illustrating how the behavior patterns program 110 and the analytics engine 116 generate the recommendation 118 are explained further in FIG. 3.

The network 220 is a medium capable of providing communication links between various devices and computers connected within the operational environment 200. Network 220 is capable of connecting the users 210, the social media content 112, user generated content 114, and/or the behavior patterns program 110. Network 220 may be a local area network (LAN), a wide area network (WAN) such as the internet, any combination thereof, or any combination of connections and protocols that will support communication between the users 210, the social media content 112, user generated content 114, and/or the behavior patterns program 110 in accordance with embodiments of the invention. Network 220 may include connections such as wire, wireless, communication links, or fiber optic cables.

The users 210 are human beings creating the user generated content 114 and the social media content 112. In some embodiments the users 210 access, edit, and create the user generated content 114 and the social media content 112 on separate client devices, the client devices capable of accessing the network 220. The set of data including the user generated content 114 and the social media content 112 that is specific to an individual user is the user's profile, designated a profile 230. In some embodiments the profile 230 is stored within Network 220. In other embodiments the profile 230 is stored in a separate server or client device as long as the behavior patterns program 110 is capable of accessing the profile 230. The set of data in the profile 230 includes location data for the user associated with the profile 230. The behavior patterns program 110 may associate the social media content 112 or the user generated content 114 with the profile 230.

Figure 3:
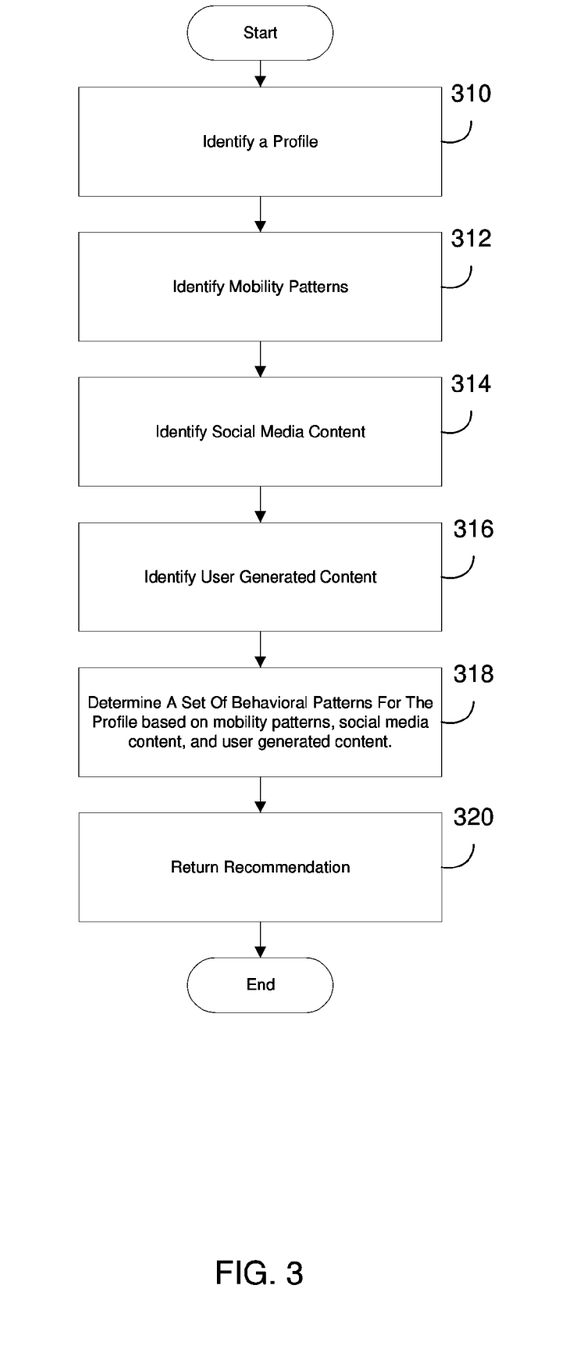
FIG. 3 is a flowchart depicting operation steps of a behavior patterns program within the computer system environment of FIG. 1 in accordance with at least one embodiment of the invention.

FIG. 3 is a flowchart depicting the operational steps of the behavior patterns program 110 executing within the computer system of FIG. 1, in accordance with an embodiment of the present invention.

In step 310, the behavior patterns program 110 identifies a profile, like the profile 230. In some embodiments, the behavior patterns program 110 may retrieve the profile 230 via network 220. In other embodiments, the behavior patterns program 110 retrieves the profile 230 from a separate server or client device. In step 310, the behavior patterns program 110 identifies the set of data in the profile 230 for the user associated with the profile 230. The set of data may include location data for the user associated with the profile 230, the social media content 112, for the user that is associated with the profile 230, and/or the user generated content 114, for the user that is associated with the profile 230. In some embodiments the set of data is stored in a registry or repository. In such an embodiment, said registry or said repository may be stored within the behavior patterns program 110 or within a separate client device as long as the behavior patterns program 110 is capable of accessing said registry or said repository. In some embodiments, the behavior patterns program 110 is able to access additional databases and repositories containing other sets of data.

In step 312, the behavior patterns program 110 identifies mobility patterns. The behavior patterns program 110 performs step 312 by identifying one or more mobility patterns. The behavior patterns program 110 identifies mobility patterns based on location data contained within the set of data within the profile 230. In some embodiments, the behavior patterns program 110 identifies mobility patterns by identifying a location a user most often frequents. In such an embodiment, the location a user most often frequents may be designated as a primary location and associating the primary location with the user. In other embodiments, a user may frequent more than one location and have one or more primary locations. In some embodiments, the behavior patterns program 110 determines mobility patterns by identifying one or more primary locations. In other embodiments, behavior pattern program 110 may correspond location data from the profile 230 with time data to determine if trends exist.

In some embodiments, the behavior patterns program 110 may access and said location data by communicating with the global positioning system. The global positioning system is a space-based satellite navigation system that is capable of sending location and time information. In some embodiments, the behavior patterns program 110 may use multi-laterational techniques to identify mobility patterns and access location data.

In step 314, the behavior patterns program 110 identifies the social media content 112. The behavior patterns program 110 performs step 314 by identifying social media content 112. The behavior patterns program 110 identifies the social media content 112 within the set of data within the profile 230. In some embodiments, the profile 230 may push, or otherwise forward the social media content 112 to the behavior patterns program 110 via the network 220. In other embodiments, the behavior patterns program 110 may retrieve the social media content 112 from the profile 230 via the network 220.

In step 316, the behavior patterns program 110 identifies user generated content 114. The behavior patterns program 110 performs step 316 by identifying user generated content 114. The behavior patterns program 110 identifies user generated content 114 within the set of data within the profile 230. In some embodiments, the profile 230 may push, or otherwise forward the user generated content 114 to the behavior patterns program 110 via the network 220. In other embodiments, the behavior patterns program 110 may retrieve the user generated content 114 from the profile 230 via the like network 220.

In step 318, the behavior patterns program 110 determines a set of behavioral patterns. The behavior patterns program 110 may determine a set of behavioral patterns based on the identified mobility patterns of step 312, identified the social media content of step 314, and identified user generated content of step 316. In some embodiments, the behavior patterns program 110 will compare the social media content 112 and/or user generated 114 to the mobility patterns identified in step 310. For example, the behavior patterns program 110 may identify that a user generates a certain type of content at their home location and a different type of content at their workplace location.

In some embodiments, the behavior patterns program 110 may determine behavior patterns using psycholinguistic factors. Broadly, psycholinguistics is the study of psychological and cognitive factors that make it possible for humans to generate sentences and grammatical structures. For example, users such as the users 210 may use specific words on a social media website, creating content such as the social media content 112. In some embodiments, the behavior patterns program 110 extracts and analyzes text data from the social media content 112 and/or the user generated content 114. In such embodiments, the behavior patterns program 110 may communicate the extracted text data from the social media content 112 and/or the user generated content 114 with the analytics engine 116. In some embodiments, the behavior patterns program 110 may use psycholinguistics and language from mobility patterns of step 312, the social media content 112, and/or the user generated content 114 to determine behavioral patterns. The behavior patterns program 110 may use psycholinguistics to determine behavioral patterns by analyzing text data. In some embodiments, the behavior patterns program 110 uses the identified mobility patterns of step 312 to determine psycholinguistic behavior patterns. In some embodiments, the behavior patterns program 110 determines the set of behavioral patterns by communicating with the analytics engine 116.

In some embodiments, the behavior patterns program 110 may construct the set of behavioral patterns by presenting content such as the social media content 112 and/or the user generated content 114 to the analytics engine 116, and receiving the set of behavioral patterns from the analytics engine 116. The analytics engine 116 may operate on or generate a model of a set of behavioral patterns and/or the recommendation 118. The model may be based on content associated with the profile 230, including the social media content 112 and the user generated content 116, which the analytics engine 116 received as input from the behavior patterns program 110.

The analytics engine 116 may receive the content associated with the profile 230 as data in n-dimensions. The analytics engine 116 may parse the data in n-dimensions and identify modes. The analytics engine 116 may use the identified modes within the data in n-dimensions to generate the model to determine the set of behavioral patterns and/or the model to determine the recommendation 118. The analytics engine 116 may determine the recommendation 118 by constructing, aggregating, or otherwise analyzing the set of behavioral patterns. The behavior patterns program 110 may further present content associated with the users 210 to the analytics engine 116, which may in turn update the model to determine the set of behavioral patterns and/or the model to determine the recommendation 118. The analytics engine 116 may return the model to determine the set of behavioral patterns, the model to determine the recommendation 118, the set of behavioral patterns, and/or the recommendation 118 to the behavior patterns program 110.

The analytics engine 116 may receive data sources that may be included in the behavior patterns program 110. The data sources may vary in terms of structure, volume, reliability, and interpretation for behavior patterns determination. In general, an aggregator (not shown) may be configured for parsing and transforming disparate data into a form that is useful to the analytics engine 116.

Included in the various data sources distributively report the social media content 112 and the user generated content 114. The social media content 112 and the user generated content 114 may both include reports from news organizations. The social media content 112 may include aggregated and parsed messages posted to publically accessible social media outlets, as well as statistical information or metadata about social media messages.

In some embodiments, the behavior patterns program 110 may determine a set of behavioral patterns by comparing the data sets within the profile 230 to one or more user profiles and determining if there are points of comparison. For example, the behavior patterns program 110 may compare a data set within a profile similar to the profile 230 but associated with a separate user to the data set within the profile 230. The profile similar to the profile 230 may be a second profile and consist of one or more alternative sets of behavioral patterns or a single alternative set of behavioral patterns. The behavior patterns program 110 may compare the profile 230 with one or more alternative profiles. The behavior patterns program 110 may make this comparison based on commonalities, relationships between the users, or other points of commonality between the sets of behavioral patterns within the profiles. The behavior patterns program 110 may aggregate the sets of behavioral patterns by identifying at least one point of commonality. The behavior patterns program 110 may communicate the aggregated set of behavioral patterns and/or second set of behavioral patterns with the analytics engine 116.

In step 320, the behavior patterns program 110 returns a recommendation 118. Recommendation 118 is based on the constructed set of behavior patterns that the behavior patterns program 110 determined in step 316. In some embodiments, the behavior patterns program 110 may be returning the recommendation 118 as an alert sent to a separate user-client device. In other embodiments, the behavior patterns program 110 may return the recommendation 118 as an advertisement on a website targeted at the user corresponding user profile 330. In other embodiments, the behavior patterns program 110 may return recommendation 118 to a third party. In some embodiments, the behavior patterns program 110 may determine an optimal time to communicate the recommendation 118 with the user associated with the profile 230. For example, if a user typically enters the string 'where to go for lunch' into a search engine at 12:30 pm the behavior patterns program 110 may send the user an email at 12:15 pm with a restaurant coupon.

Figure 4:
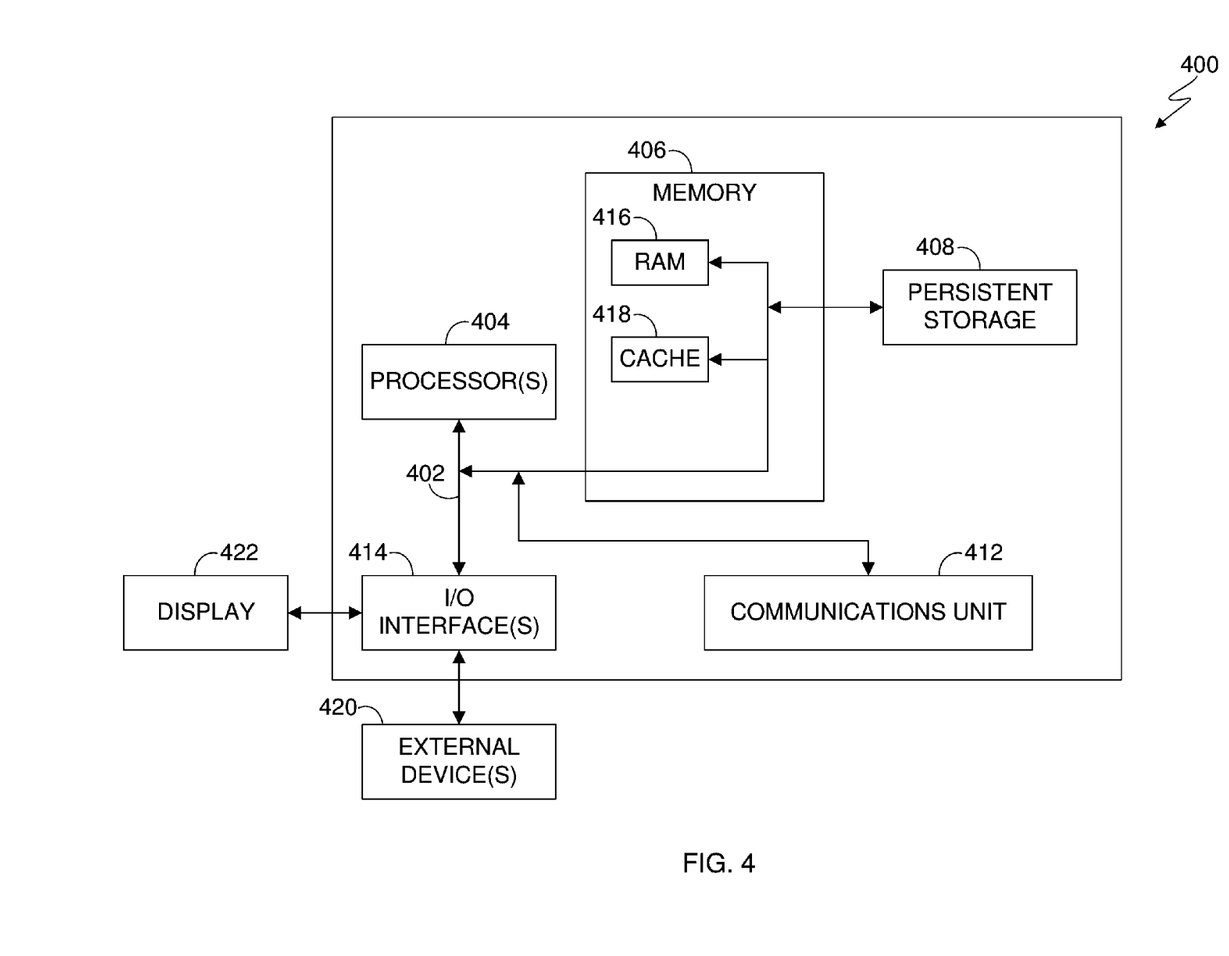
FIG. 4 is a block diagram of a computing apparatus suitable for executing the behavior patterns program in accordance with at least one embodiment of the present invention.

FIG. 4 is a block diagram depicting components of a computer 400 suitable for executing the behavior patterns program 110. FIG. 4 displays the computer 400, the one or more processor(s) 404 (including one or more computer processors), the communications fabric 402, the memory 406, the RAM 416, the cache 418, the persistent storage 408, the communications unit 412, the I/O interfaces 414, the display 422, and the external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g. microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for the behavior patterns program 110 may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 506 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a profile;
   monitoring online activity of a user associated with the profile;
   based, at least in part, on a frequency of access of a given online location by the user, identifying one or more online activity patterns for the user based on said online activity, said one or more online activity patterns being associated with the user associated with said profile;
   identifying social media content from at least one location frequented by the user, said social media content from at least one location being associated with the user associated with said profile;
   identifying user generated content from at least one location, said user generated content being associated with the user associated with said profile;
   determining a set of time-based behavioral patterns for the user associated with said profile, said set of time-based behavioral patterns being based on said online activity patterns, said social media content from at least one location, and said user generated content from at least one location; and
   based on a behavior being predicted to occur within a specific time period that is associated with the behavioral pattern of the user, returning a recommendation for the user associated with said profile prior to the behavior being exhibited by the user, said recommendation being based on said set of time-based behavioral patterns.

2. The computer-implemented method of claim 1, wherein identifying one or more online activity patterns comprises:
   identifying one or more primary locations; and
   associating the one or more primary locations with the user associated with said profile.

3. The computer-implemented method of claim 1, wherein determining a set of time-based behavioral patterns for the user associated with said profile comprises:
   analyzing text data, said text data being extracted from said social media content and said user generated content; and constructing said set of time-based behavioral patterns based on said text data.

4. The computer implemented method of claim 3, wherein analyzing text data is based on psycholinguistic factors.

5. The computer implemented method of claim 1, wherein determining a set of time-based behavioral patterns for the user associated with said profile comprises:
   aggregating said set of time-based behavioral patterns for the user associated with said profile with one or more alternative sets of time-based behavioral patterns for one or more alternative profiles;
   constructing an aggregated set of time-based behavioral patterns; and
   constructing said set of time-based behavioral patterns, said set of behavior patterns being based on said aggregated set of time-based behavioral patterns.

6. The computer implemented method of claim 5, wherein aggregating said set of time-based behavioral patterns for the user associated with said profile with one or more alternative sets of time-based behavioral patterns for one or more alternative profiles comprises:
   identifying at least one point of commonality between said set of time-based behavioral patterns and said alternative set of time-based behavioral patterns; and
   returning a recommendation, said recommendation being based on said at least one point of commonality between said set of time-based behavioral patterns and said alternative set of time-based behavioral patterns.

7. A computer program product comprising:
   one or more computer readable storage media and program instructions stored on one or more computer readable storage media, said program instructions comprising instructions to:
   identify a profile;
   monitor online activity of a user associated with the profile;
   based, at least in part, on a frequency of access of a given online location by the user, identify one or more online activity patterns for the user based on said online activity, said one or more online activity patterns being associated with the user associated with said profile;
   identify social media content from at least one location frequented by the user, said social media content from at least one location being associated with the user associated with said profile;
   identify user generated content from at least one location, said user generated content being associated with the user associated with said profile;
   determine a set of time-based behavioral patterns for the user associated with said profile, said set of time-based behavioral patterns being based on said online activity patterns, said social media content from at least one location, and said user generated content from at least one location; and
   based on a behavior being predicted to occur within a specific time period that is associated with the behavioral pattern of the user, return a recommendation for the user associated with said profile prior to the behavior being exhibited by the user, said recommendation being based on said set of time-based behavioral patterns.

8. The computer program product of claim 7, wherein said program instructions to identify one or more online activity patterns comprise instructions to:
   identify one or more primary locations; and
   associate the one or more primary locations with the user associated with said profile.

9. The computer program product of claim 7, wherein said program instructions to determine a set of time-based behavioral patterns for the user associated with said profile comprise instructions to:
   analyze text data, said text data being extracted from said social media content and said user generated content; and
   construct said set of time-based behavioral patterns based on said text data.

10. The computer program product of claim 9, wherein said program instructions to analyze text data are based on psycholinguistic factors.

11. The computer program product of claim 7, wherein said program instructions to determine a set of time-based behavioral patterns for the user associated with said profile comprise instructions to:
    aggregate said set of time-based behavioral patterns for the user associated with said profile with one or more alternative sets of time-based behavioral patterns for one or more alternative profiles;
    construct an aggregated set of time-based behavioral patterns; and
    construct said set of time-based behavioral patterns, said set of behavior patterns being based on said aggregated set of time-based behavioral patterns.

12. The computer program product of claim 11, wherein said program instructions to aggregate said set of time-based behavioral patterns for the user associated with said profile with a second set of time-based behavioral patterns for a second profile comprise instructions to:
    identify at least one point of commonality between said sets of time-based behavioral patterns; and
    determine, based on said at least one point of commonality between said set of time-based behavioral patterns and said alternative set of time-based behavioral patterns.

13. A computer system comprising:
    one or more computer processors;
    one or more computer readable storage media;
    computer program instructions stored;
    said computer program instructions being stored on said computer readable storage media for execution by at least one of said one or more processors, said program instructions comprising instructions to:
    identify a profile;
    monitor online activity of a user associated with the profile;
    based, at least in part, on a frequency of access of a given online location by the user, identify one or more online activity patterns for the user based on said online activity, said one or more online activity patterns being associated with the user associated with said profile;
    identify social media content from at least one location frequented by the user, said social media content from at least one location being associated with the user associated with said profile;
    identify user generated content from at least one location, said user generated content being associated with the user associated with said profile;
    determine a set of time-based behavioral patterns for the user associated with said profile, said set of time-based behavioral patterns being based on said online activity patterns, said social media content from at least one location, and said user generated content from at least one location; and based on a behavior being predicted to occur within a specific time period that is associated with the behavioral pattern of the user, return a recommendation for the user associated with said profile prior to the behavior being exhibited by the user, said recommendation being based on said set of time-based behavioral patterns.

14. The computer system of claim 13, wherein said program instructions comprising instructions to identify one or more online activity patterns comprise program instructions comprising instructions to:

identify one or more primary locations; and associate the one or more primary locations with the user associated with said profile.

15. The computer system of claim 13, wherein said program instructions comprising instructions to determine a set of time-based behavioral patterns for the user associated with said profile comprise program instructions comprising instructions to:

analyze text data, said text data being extracted from said social media content and said user generated content; and construct said set of time-based behavioral patterns based on said text data.

16. The computer system of claim 15, wherein said program instructions comprising instructions to analyze text data are based on psycholinguistic factors.

17. The computer system of claim 13, wherein said program instructions comprising instructions to determine a set of time-based behavioral patterns for the user associated with said profile comprise program instructions to:

aggregate said set of time-based behavioral patterns for the user associated with said profile with one or more alternative sets of time-based behavioral patterns for one or more alternative profiles;

construct an aggregated set of time-based behavioral patterns; and construct said set of time-based behavioral patterns, said set of time-based behavior patterns being based on said aggregated set of time-based behavioral patterns.

18. The computer system of claim 17, wherein said program instructions comprising instructions to aggregate said set of time-based behavioral patterns for the user associated with said profile with a second set of time-based behavioral patterns for a second profile comprise program instructions to:

identify at least one point of commonality between said sets of time-based behavioral patterns; and determine, based on said at least one point of commonality between said set of time-based behavioral patterns and said alternative set of time-based behavioral patterns.

* * * * *